H. J. LEBHERZ.
MACHINE FOR TRIMMING AND CLEANING BRUSHES.
APPLICATION FILED JULY 12, 1907.
913,523.
Patented Feb. 23, 1909.
4 SHEETS—SHEET 1.
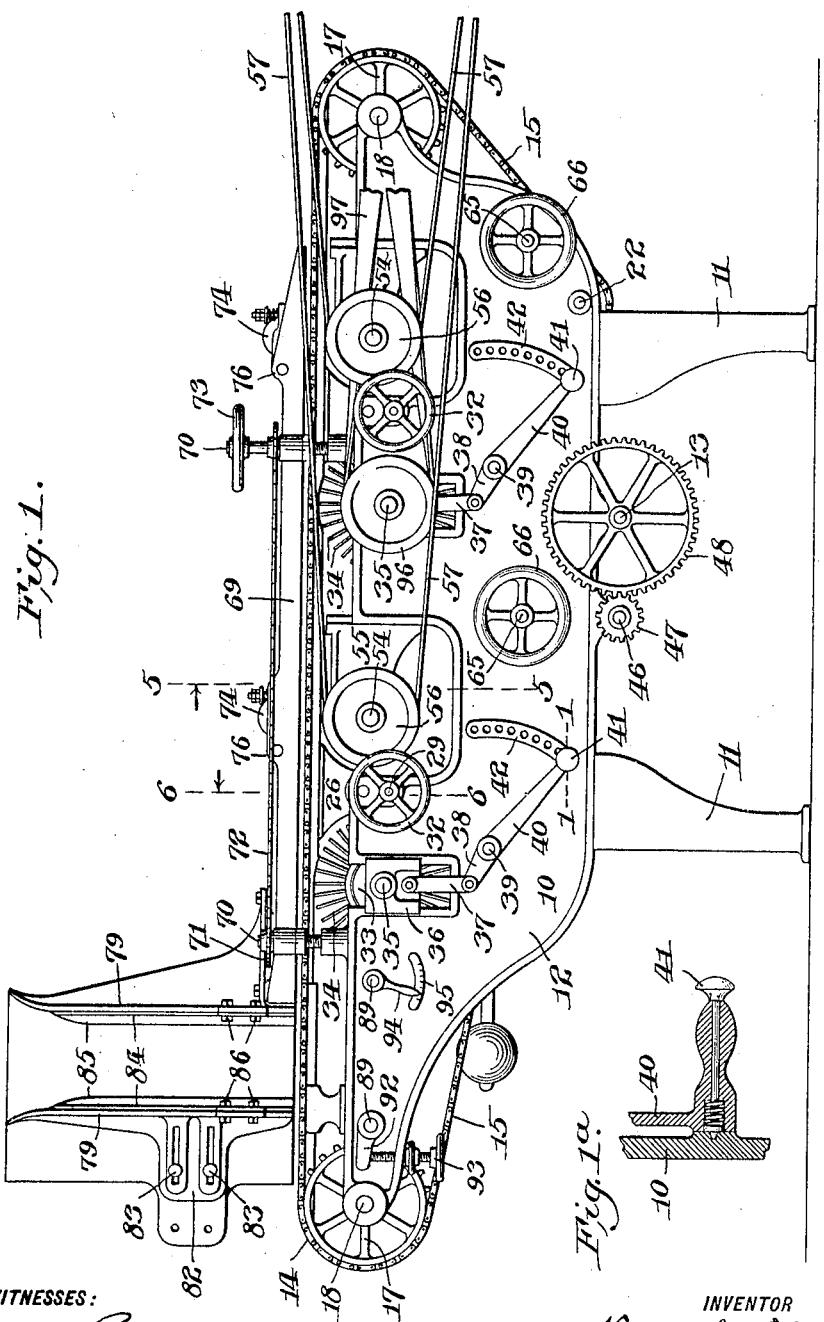

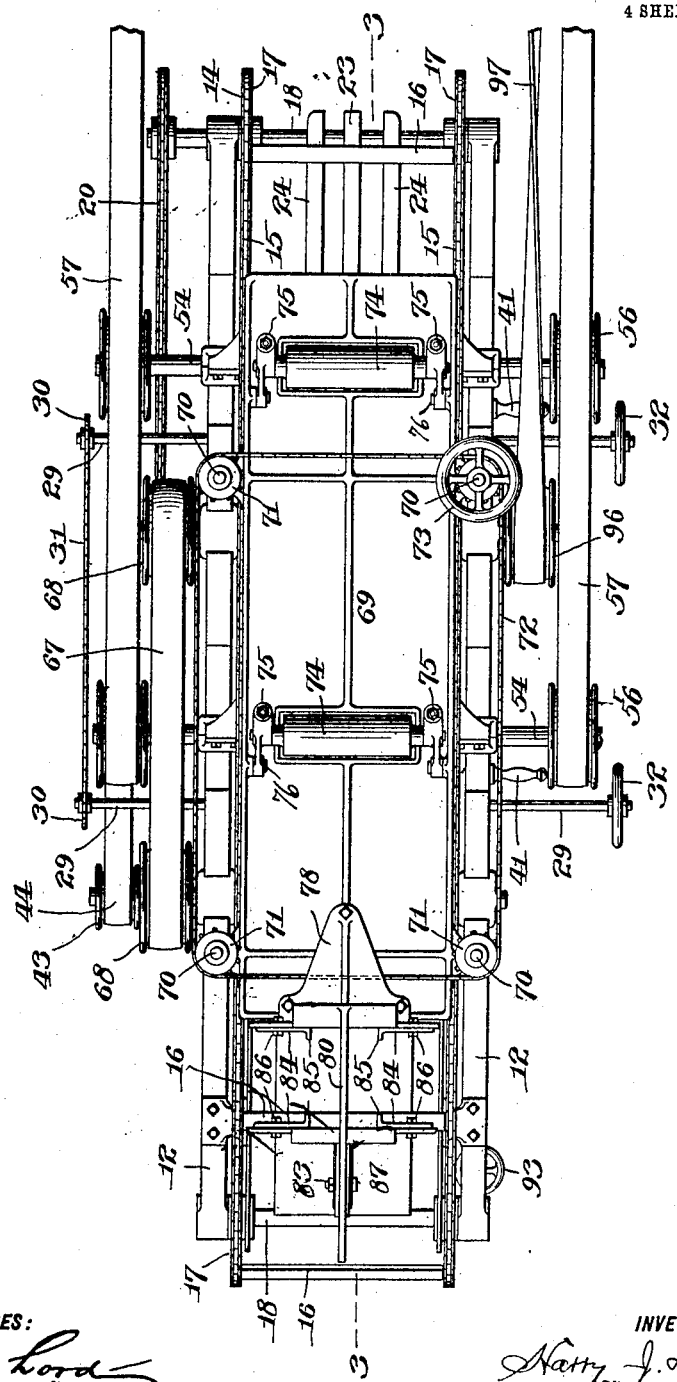

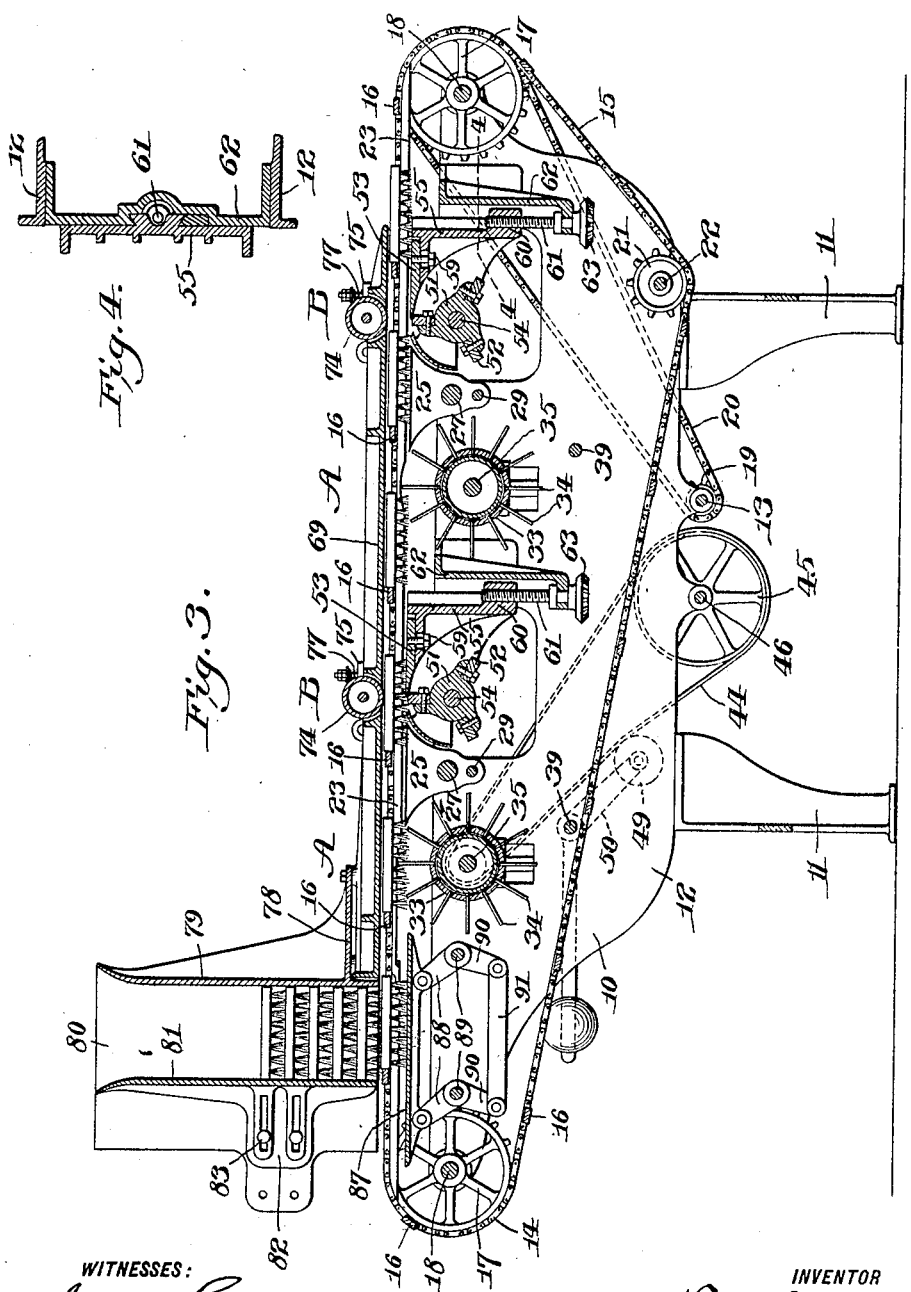

H. J. LEBHERZ.
MACHINE FOR TRIMMING AND CLEANING BRUSHES.
APPLICATION FILED JULY 12, 1907.
913,523.
Patented Feb. 23, 1909.
4 SHEETS—SHEET 4.
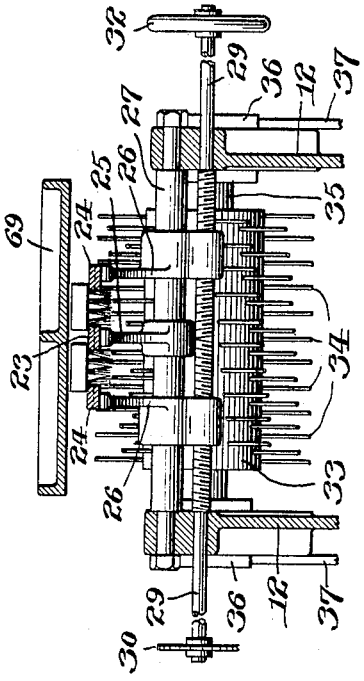
Fig. 7.
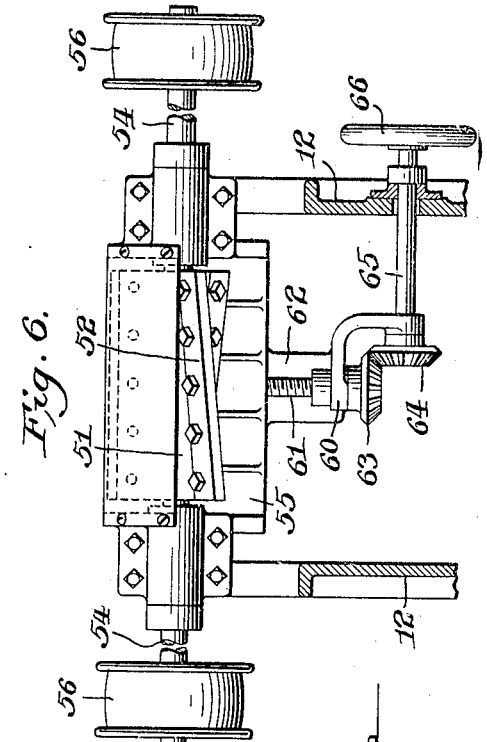
Fig. 6.
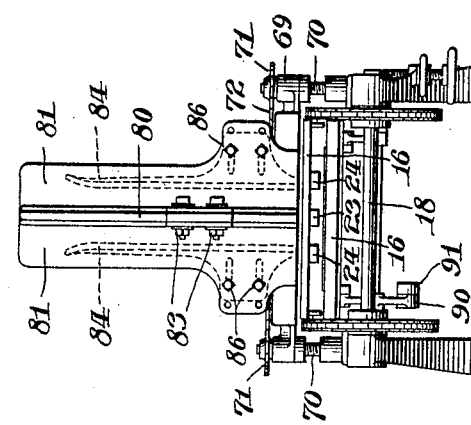
Fig. 5.
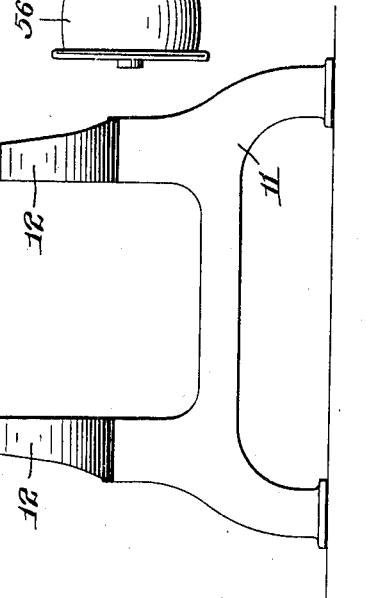
WITNESSES:
James Lord
Ira Bell
INVENTOR
Harry J. Lebherz
BY
John F. Nolan
ATTORNEY.

UNITED STATES PATENT OFFICE.

HARRY J. LEBHERZ, OF FREDERICK, MARYLAND, ASSIGNOR, BY MESNE ASSIGNMENTS, TO THE OX FIBRE BRUSH COMPANY, A CORPORATION OF WEST VIRGINIA.

MACHINE FOR TRIMMING AND CLEANING BRUSHES.

No. 913,523.　　　　　Specification of Letters Patent.　　　Patented Feb. 23, 1909.

Application filed July 12, 1907. Serial No. 383,385.

*To all whom it may concern:*

Be it known that I, HARRY J. LEBHERZ, a citizen of the United States, residing at Frederick, in the county of Frederick and State of Maryland, have invented certain new and useful Improvements in Machines for Trimming and Cleaning Brushes, of which the following is a specification.

This invention has for its object to provide a machine for economically and efficiently cleaning and trimming brush-bristles after they have been inserted in the usual backs.

The form of embodiment of the invention which I have herein selected for illustration, comprises, generally stated, rotary cleaning and trimming devices; a conveyer for impelling the brushes to and across the path of said devices in succession; a trackway for supporting and guiding the brushes during their travel, and a suitable feed hopper by means of which the brushes are supplied to the trackway, together with various features of construction and operation whereby practical advantages are gained, as will be hereinafter fully described.

The scope of the invention will appear from the appended claims.

In the drawings—Figure 1 is a side elevation of a machine illustrative of the preferred form of embodiment of my invention. Fig. 1ª is a sectional detail of a locking device for the hand lever by means of which the bearing blocks for the primary cleaner are adjusted, as on the line 1—1 of Fig. 1. Fig. 2 is a plan of the machine. Fig. 3 is a longitudinal vertical section thereof, as on the line 3—3 of Fig. 2, showing the machine as in actual operation. Fig. 4 is a partial transverse horizontal section, as on the line 4—4 of Fig. 3. Fig. 5 is a front end elevation of the machine. Fig. 6 is a transverse vertical section, as on the line 5—5 of Fig. 1. Fig. 7 is a similar section, as on the line 6—6 of Fig. 1.

10 is an appropriate supporting frame, comprising standards 11 and parallel side members 12.

14 is an endless conveyer extending longitudinally of the main frame, within the space between the side members, and comprising a pair of parallel chains 15 connected at regular intervals by transverse bars 16. These chains pass around sprocket wheels 17 carried by transverse shafts 18 at the respective ends of the frame, the rearward shaft being geared with and driven from a wheel 19 on a shaft 13 hereinafter referred to, by means of a sprocket chain 20. The upper run of the conveyer travels in a horizontal path, while the lower run is deflected downwardly, sufficiently to clear the operating mechanism, by means of sprocket wheels 21 carried by a transverse shaft 22 suitably journaled in bearings in the main frame.

Extending longitudinally of the frame, and directly below the path of travel of the transverse bars on the horizontal run of the conveyer, are one or more tracks comprising parallel rails upon which the side edges of the brush backs are supported. The backs thus extend into the path of the bars and are engaged and impelled thereby along the track or tracks.

In the present illustration of my invention provision is had for impelling two rows of brushes, and hence two parallel trackways are provided. These trackways comprise a central rail 23 and two side rails 24, the same being supported by brackets 25, 26, rising from cross-bars 27, 27, respectively, secured in and between the side members of the main frame.

The brackets 25 for the central rail are fixedly secured to the bars 27 while those for the side rails are movable longitudinally of the bars 27, to the end that the side rails may be adjusted toward or from the central rail in order to vary the width of the intervening spaces for the accommodation of brushes of different widths. Any suitable mechanism may be employed for adjusting the side rails. In the present instance their brackets 26 are extended below the bars 27, and the extensions provided with appropriately threaded orifices to which are fitted corresponding screw shafts 29 which are journaled at a suitable distance apart in the walls of the main frame. Each of the shafts 29 has a righthand and lefthand screw thread, so that when the shaft is properly turned the brackets 26 will be moved in opposite directions to each other in a manner to adjust the side rails either toward or from the central rail, as desired. In order to turn both shafts 29 concurrently, and thus insure the parallel adjustment of the side rails, the shafts are extended beyond the respective sides of the main frame.

The projecting ends on one side are provided with corresponding sprocket wheels 30, which are connected by a sprocket chain 31, and the projecting ends on the other side are equipped with hand wheels 32. Hence by turning either of the hand wheels, the simultaneous actuation of the shafts, and corresponding adjustment of the two tracks, can be readily accomplished.

Arranged at intervals in the main frame, are the clearing and trimming mechanism A, B, respectively, to the actions of which the bristles of the brushes are successively subjected as they are carried along by the conveyer. The cleaners and trimmers are herein represented as duplicated, but it is to be understood that in some cases a single cleaner and a single trimmer will suffice. The primary cleaner preferably comprises a rotating roller or drum 33, provided with rows of axially projecting pins or studs 34, which constitute beaters. The roller is carried by a shaft 35 which is journaled in vertically-adjustable bearing-blocks 36 slidingly fitted to guides in the sides of the main frame, whereby the roller may be adjusted toward or from the trackways, as the length of the depending bristles may require. As a simple and efficient means to effect the adjustment of the blocks 36, they are respectively connected by links 37 with two arms 38 extending from a transverse rock-shaft 39 in the main frame. One of the said arms constitutes a part of a hand lever 40 by means of which the rock-shaft may be readily rotated. This lever is conveniently provided with a suitable spring-actuated stud 41 (Fig. 1ª) which may be engaged with a perforated locking sector 42 on the side of the main frame in order to retain the blocks in the pre-determined position of vertical adjustment.

One end of the shaft 35 of the second cleaner is provided with a pulley 96, around which extends a belt 97, leading from a suitable driving pulley on a driving shaft not shown. Thus the roller 33 is driven at a high rate of speed to cause its radially projecting studs to penetrate the depending tufts, and comb and beat therefrom loose bristles, dirt and other foreign matter. The other end of the shaft 35 of the primary cleaner is conveniently driven from the shaft 35 of the second cleaner, by means of a belt 67 passing around pulleys 68, of the respective cleaners. The shaft 35 of the primary cleaner is provided with a pulley 43 which is connected by means of a belt 44 with a larger pulley 45 upon a shaft 46, adjacent the shaft 13; the shaft 13 being actuated from the shaft 46, by a pinion 47 on the shaft 46, in gear with a spur wheel 48 on the shaft 13.

In rear of the primary cleaner is the primary trimmer B which, in its preferred form, comprises a rotatable cutter head 51 provided on its periphery with detachable cutter blades 52 constructed and arranged to co-act with a relatively fixed cutter blade 53 in the path of the depending bristles. This head 51 is carried by a shaft 54 journaled in bearings in a frame 55 vertically adjustable on a bracket 62 extending between the side members of the main frame. The shaft is provided at its ends with pulleys 56 which are connected by belts 57 with suitable driving pulleys on a power shaft not shown. The blade 53 is mounted on the frame 55 in close relation to the path of the blades 52 by means of a set-screw 59, whereby the blade 53 may be nicely adjusted to compensate for wear, etc. The frame 55 is provided with a tapped lug 60 to which is fitted a vertical screw shaft 61 journaled in the bracket 62 on the main frame of the machine. On the lower end of the screw shaft 61 is a bevel wheel 63 which meshes with a similar wheel 64 on a transverse shaft 65 which projects through and beyond the main frame, and bears a hand wheel 66. By properly turning this wheel, the screw-shaft 61 is rotated in a manner to raise or lower the frame 55 and its appurtenances, and thereby adjust the cutter in respect to the depending bristles.

When the brushes leave the first trimmer they pass to the second cleaner A, and thence to the second trimmer B. The second cleaner and trimmer are identical in construction and operation with the primary cleaner and trimmer. The second cleaner removes from the depending bristles any short or loose bristles that may remain thereon, and the second cleaner insures the trimming of irregular depending bristles that may then remain in the brushes.

In order to maintain the brushes firmly and uniformly upon the trackways, as the brushes are being carried along and being subjected to the operations of the cleaning and trimming devices, I arrange immediately above the main frame a rectangular top-plate 69 which is supported at or near its four corners by screw-shafts 70 rising from the side members of the frame. These shafts are fitted to tapped lugs in the top-plate, and are provided with sprocket-wheels 71 around which passes an endless chain 72. One of the screw shafts is provided with a hand-wheel 73, by the rotation of which the four shafts may be simultaneously actuated uniformly to raise or lower the top plate as desired, in order to accommodate brush-backs of varying thickness. The top-plate is preferably provided with transverse pressure rollers 74 which are arranged to bear upon the brushes and hold them uniformly in engagement with the trimmers. The shafts of these rollers are journaled in brackets 75 on the top-plate. The brackets are each pivoted at one end to lugs 76 on the plate, and held depressed at the other end by means of suitably disposed springs 77, so that the rollers exert a yielding pressure upon the brush backs as the latter pass thereunder.

To facilitate the feeding of the brushes to the machine, I preferably though not essentially, provide a suitable supply hopper therefor. This hopper is affixed to the forward end of the top plate so as to partake of the vertical adjustments thereof. It includes a base piece 78; a transversely extending end wall 79 thereon, and a central forwardly extending partition 80 on the said wall, these parts being preferably integral, as shown. The other end wall comprises two separate plates 81, provided with slotted projections 82 which are secured by bolts 83 to the partition, whereby said plates may be adjusted toward and from the wall to vary the internal length of the hopper, as desired. On the inner sides of the respective end walls are secured vertical plates 84 having inwardly-turned edge flanges 85 which, in conjunction with the opposing sides of the partition, constitute guides for the lateral edges of the brush back. These plates 84 are slotted, and secured to the respective end walls by screw bolts 86, so as to be adjustable toward and from the partition to accommodate brushes of different widths. The hopper as thus constructed is adapted to receive two piles of superposed brushes and deliver them in pairs to the underlying conveyer.

It is to be noted that the brush supporting and guiding rails commence at or beyond the inner end wall of the hopper, as, obviously, if they extended beneath the hopper the laterally flaring bristles of the brushes would interfere with the proper seating of the brushbacks upon the track rails. In order, therefore, to support the lowermost pair of brushes in the path of the conveyer and in position to be carried thereby on to the trackways, a horizontal table 87 is arranged beneath the hopper and below the upper run of the conveyer. This table is adjustable vertically to accommodate brushes having bristles of different lengths, and to this end it is supported upon parallel arms 88 rising from transverse rock shafts 89 journaled in the side members of the main frame. These shafts are provided with depending arms 90 connected by a link 91. One of the shafts 89 carries on its outer end a toe 92 which rests upon a vertical hand-screw 93 journaled in the adjacent member of the main frame, and the other shaft is furnished with a pointer 94 which moves about a graduated index 95 on the frame. By properly turning the hand-screw the toe is adjusted vertically to regulate to a nicety the horizontal plane of the table with respect to the trackway, and the pointer and index accordingly indicate the position of adjustment.

I claim—

1. In a machine of the character described the combination of a bristle-treating device, trackways upon which brushes are supported and guided in respect to said device, said trackways comprising two outer rails and a central rail, means for simultaneously adjusting the outer rails toward or from the central rail, and means for conveying brushes along said trackways.

2. In a machine of the character described, the combination of a bristle-treating device, trackways upon which brushes are supported and guided in respect to said device, said trackways comprising two outer rails and a central rail, a screw shaft having right and left hand threads, operative connections between the threaded portions of said shaft and the outer rails, respectively, means for operating said shaft, and means for conveying brushes along said trackways.

3. In a machine of the character described, the combination of a bristle cleaner, a bristle trimmer, a trackway upon which brushes are supported and guided across the paths of said cleaner and trimmer, respectively, a bed overhanging the trackway and constituting a back support and guide for the brushes, means for adjusting the bed toward and from the trackway, and means for conveying brushes along said trackway.

4. In a machine of the character described, the combination of a bristle cleaner, a bristle trimmer, a trackway upon which brushes are supported and guided across the paths of said cleaner and trimmer, respectively, a bed overhanging the trackway and constituting a back support and guide for the brushes, pressure rollers mounted in said bed directly above the trimmer, means for adjusting the bed toward and from the trackway, and means for conveying brushes along said trackway.

5. In a machine of the character described, the combination with a source of supply of brushes, of a brush conveyer, a trackway to and along which the brushes are advanced by the conveyer, and a table below the source of supply.

6. In a machine of the character described, the combination with a source of supply of brushes, of a brush conveyer, a trackway to and along which the brushes are advanced by the conveyer, a table below the source of supply, and means for vertically adjusting the table.

7. In a machine of the character described, the combination with a source of supply of brushes, a brush conveyer, a trackway to and along which the brushes are advanced by the conveyer of a supporting table below the said source of supply, rock-shafts, arms thereon carrying said table, depending arms on said shafts, a link connecting the latter arms, and adjusting means for partially turning one of said shafts.

8. In a machine of the character described, the combination with a trackway, of means for moving brushes along the same, a top-plate overhanging the trackway, a brush supply hopper supported by said plate, and means for vertically adjusting the plate and hopper.

9. A brush supply hopper comprising an end wall member, a central partition extending therefrom, sectional end wall members on said partition, adjustable connections between said members and partition, vertical side plates on the inner sides of the respective wall members, and adjustable connections between said plates and wall members.

In testimony whereof, I, have signed my name to this specification in the presence of two subscribing witnesses, this 6th day of July, 1907.

HARRY J. LEBHERZ.

Witnesses:
 GEO. T. BAUMGARDNER,
 HARRY C. HULL.